March 8, 1966 J. H. LEMELSON 3,239,602

THERMOPLASTIC RECORDING AND REPRODUCING APPARATUS WITH SELECTIVE BEAM ERASURE

Filed March 20, 1961 3 Sheets-Sheet 1

INVENTOR.

Jerome H. Lemelson

BY

March 8, 1966 J. H. LEMELSON 3,239,602

THERMOPLASTIC RECORDING AND REPRODUCING APPARATUS WITH SELECTIVE BEAM ERASURE

Filed March 20, 1961 3 Sheets-Sheet 2

INVENTOR.

Jerome H. Lemelson

BY

INVENTOR.
JEROME H. LEMELSON
BY

BEST AVAILABLE COPY

United States Patent Office 3,239,602 Patented Mar. 8, 1966

3,239,602

THERMOPLASTIC RECORDING AND REPRODUCING APPARATUS WITH SELECTIVE BEAM ERASURE

Jerome H. Lemelson, 8B Garfield Apts., Metuchen, N.J.

Filed Mar. 20, 1961, Ser. No. 123,327
4 Claims. (Cl. 178—6.6)

More particularly this invention relates to an erasable optical recording system employing an endless track, image recording member for transducing a video signal such as that derived from the output of a video camera to a plurality of images which are optically scanned and projected immediately thereafter onto a screen for monitoring or viewing.

The conventional television projection system requires in addition to a light source and an optical system, an intermediate transducer of the received video picture signals to convert them to an image or images which transducer is generally in the form of a cathode ray tube. The employment of a cathode ray tube presents numerous problems. A substantial amount of clarity and resolution, for example, is lost in scanning and converting the image formed on the face of the tube into the projected image. Tube life, maintenance, image persistence, and the many problems associated with projecting an image by reflection results in a projected image which is substantially inferior to the image derived by motion picture film projection. If color television is employed, numerous other problems relating to color, resolution, tube and receiver circuit complexity, are introduced which often result in the projection of a poor image or images.

It is accordingly a primary object of this invention to provide a new and improved television receiving apparatus.

Another object is to provide an improved television receiving apparatus which does not require the conventional cathode ray tube for viewing images received thereby.

Another object is to provide a new and improved thermoplastic recording apparatus in which the recorder is also provided with means for projecting onto a viewing screen the still or motion pictures developed in the recording member as ripple patterns shortly after receipt of the television picture signal and immediately after the development of said ripple patterns, thereby eliminating the need for removing the recording member and placing it into a projector.

Another object is to provide an improved thermoplastic recording apparatus which is provided with separate monitor means and a projection means.

Still another object is to provide an improved thermoplastic recording apparatus having an air evacuated volume in which recording takes place, which volume is maintained separate from the light source of a projection optical system therefore and other components of the projection system so that adjustments or replacements thereto may be made without admitting air to the air evacuated working zone.

Another object is to provide a thermoplastic recording apparatus including means for recording a plurality of image frames which may be viewed as a motion picture or individually without removal of the recording member from the air evacuated chamber.

Another object is to provide television receiving apparatus for receiving and projecting color television signals without the need for the intermediary employment of a relatively complex cathode ray tube.

Another object is to provide an improved thermoplastic recording apparatus which may be easily applied to a plurality of different projection optical systems.

Another object is to provide improved structures in recording members applicable to still or motion picture projection, computing apparatus and the like.

Another object is to provide an improved erasable recording apparatus which may be applicable to computing systems as a means for temporarily storing a large amount of coded or analog data which is easily and rapidly accessible to a scanning means.

Another object is to provide improved apparatus for modulating coherent light and the like for communication and other purposes.

Another object is to provide an improved image storage disc which may be easily scanned and is applicable as an intermediate storage means for a computer.

These as well as other objects of this invention will readily become apparent after reading the following description of the accompanying drawings in which:

FIG. 1 is a partly sectioned schematic side view of an apparatus for recording and simultaneously projecting images, FIG. 2 is a partly sectioned side view of a modified form of recording and projection apparatus, FIG. 3 is a partly sectioned side view of a modified form of recording and projection apparatus, FIG. 4 is a schematic, isometric view of a recording and projection apparatus employing a rotating disc as a support for a heat developable recording material, FIG. 5 is an isometric view showing a modified form of FIG. 4, FIG. 6 is an end elevation of a recording-projector, FIG. 7 and 7′ is a front view of the recording disc of FIG. 6, FIG. 8 is a fragmentary view taken in cross section of a structure in an erasable image recording drum.

Figures 1, 2, 3:
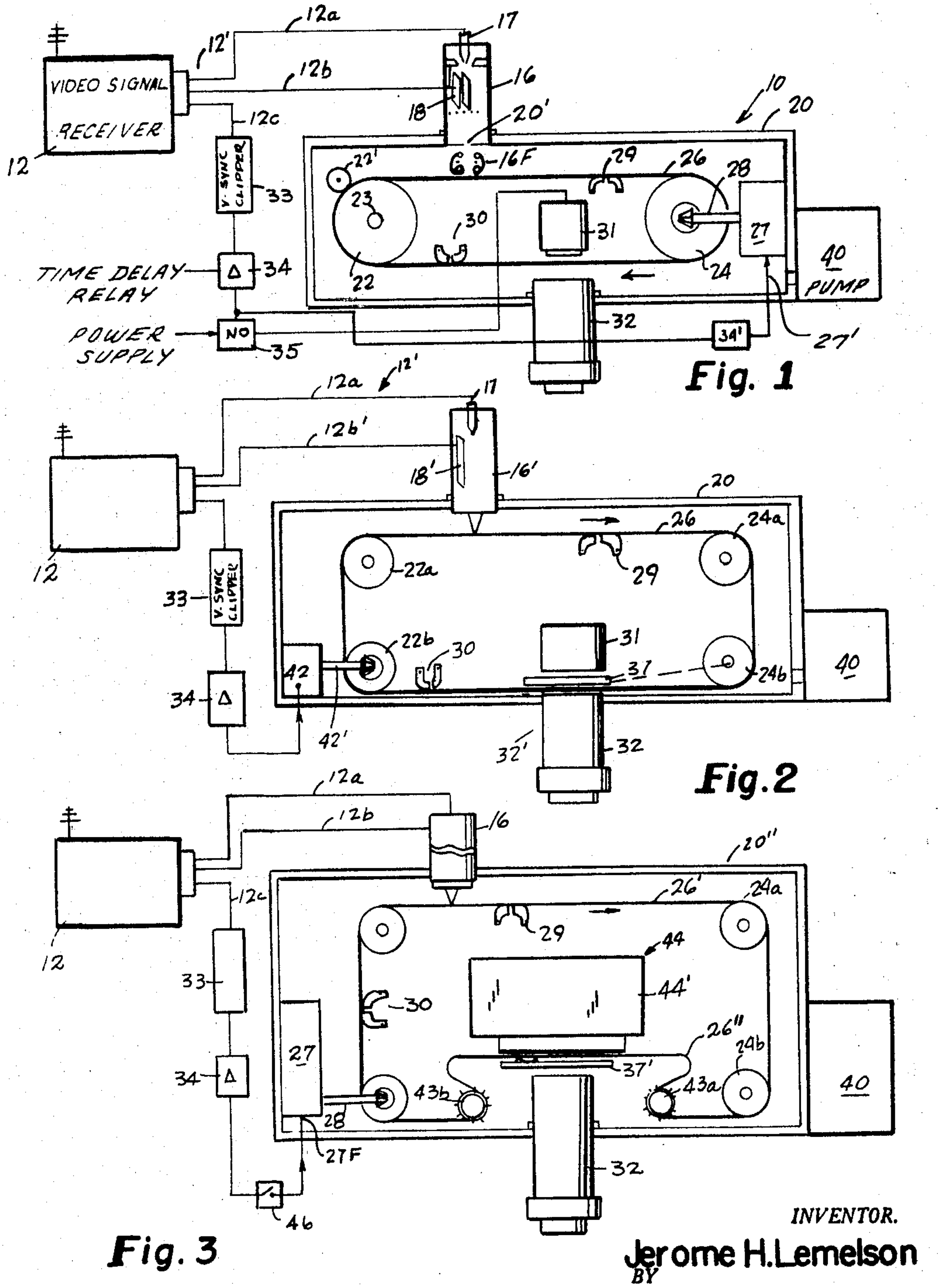

The present invention relates to a system of thermoplastic recording which includes apparatus for immediately projecting images derived from a thermoplastic recording member as soon as or shortly after they are formed in said member. The conventional thermoplastic recording apparatus as developed by the General Electric Company which is briefly described and illustrated on page 1870 (vol. 30, No. 12) of the Journal of Applied Physics and in the literature published by the General Electric Research Laboratory and released on January 12, 1960, employs a recorder for motion picture signals in which a so-called thermoplastic recording film or tape is transported in an air evacuated chamber and is scanned by a focused electron beam which is modulated by the output of a television camera. The so-called thermoplastic recording film is driven from a supply reel to a take-up reel and must be removed from the air evacuated chamber if it is desired to project the resulting motion picture onto a screen for viewing by a large audience.

Improvements are provided hereafter in the design of such thermoplastic recording apparatus, whereby it may be used also as a projection apparatus so that it is not necessary to remove the thermoplastic recording member therefrom in order to permit a large audience to view the television motion picture phenomena shortly after it is received. The resulting projected still or motion picture is superior in quality and resolution to that obtained when the conventional television projection system is employed which utilizes a cathode ray tube as an intermediary transducer for converting the television picture signals into images. Furthermore, the projection system

BEST AVAILABLE COPY is a substantial simplification over the conventional television projection system which must convert the image on the face of the cathode ray tube to a projectible image by reflection means.

The conventional thermoplastic recording apparatus comprises an assembly of an electron gun and a sealed housing for a thermoplastic recording tape and a transport for said tape which includes a supply reel and a take-up reel. As the tape moves past the electron gun, the electron beam scans the tape and provides an image charge pattern in the storage layer of the thermoplastic film. An RF heater positioned beyond the gun melts the plastic of the thermoplastic layer of the film. Electrostatic forces between the films electrons and positive charges in the carrier tape depress the surface of the thermoplastic layer until they are balanced by surface tension forces. This causes the formation of surface deformations, ridges and valleys which will hereafter be referred to as a ripple pattern. In utilizing the conventional thermoplastic recording apparatus, the thermoplastic film or tape is removed from the air evacuated housing and is placed on a conventional motion picture projector utilizing a special optical system in order to provide a visual image on a screen. In projecting black and white, a Schlieren optical system is employed as part of the projection apparatus. When color is desired to be projected a system employing line light sources, a condensing lens, a picture element grating, and a projection lens as described in the November 1958 issue of the Journal of the American Optical Society in an article by Dr. W. E. Glenn, is described. The optical projection systems described hereafter are assumed to be designed in accordance with either the Schlieren system or that described in said magazine article.

The current invention consists of improvements to the conventional thermoplastic recording apparatus which will permit the projection of motion pictures or still images which have been transmitted by short wave or other means onto a viewing screen for viewing by large audiences shortly after said signals are received and without removal of the thermoplastic recording member from the air evacuated chamber of the apparatus. As a result audiences such as those in a motion picture theatre may view events remote from them substantially as they happen with substantially the same acuity and clarity obtainable with conventional film projection apparatus.

A preferred form of the invention is illustrated in FIG. 1, which utilizes a flexible thermoplastic recording belt or strip as the temporary recording medium, although a disc, drum or other type of closed loop tape arrangement may also be provided.

In FIG. 1, the receiving and projection apparatus 10 consists of a short wave receiver 12 for composite video picture signals, the output of the last amplifying stage of which is coupled to the electrode and deflection means 17, 18, respectively of an electron gun 16 which communicates with a housing 20 thru opening 20'. The interior of the combined volume is reduced in pressure to near vacuum by means of pump 40. The black and white or color TV signals received by 12 thus modulate the electron beam of the gun 16 which provides a charge pattern on the surface of a closed loop thermoplastic recording tape 26 which is driven at constant speed around two drums or reels 22 and 24. Gear motor 27 is coupled to shaft 23 on which 22 rotates and drives 22 clockwise. The image ripple pattern or deformation pattern caused by the beam is "frozen" in the thermoplastic layer of 26 after being made molten by the action of a first RF heater 29 which induces current in a transparent conducing coating, upon solidification of the plastic beyond the heater.

Situated beyond 29 in the clockwise direction is an image optical projection system consisting of a housing 31 containing a light source and condensing lens and a housing 32 containing Schlieren optical elements including a grid and projection lens as described in the Jour. Optical Society Am., 48,841 (1958) which are provided for projecting either black and white or color images just produced in 26 by the action of 16 and 29, onto a screen. The ripple pattern in 26 may be thereafter removed by reheating the tape to a higher temperature than that in which the pattern was formed by means of a second RF heater 30. The heater 30 heats the film well above its melting point so that its conductivity will increase and surface tension smooths out the deformations after which the film passes around drum 24 then drum 22 and is reused as the continuous exposure-erasure process proceeds. A depressor roll 22' may be used to enhance the smoothing out process by compressing the thermoplastic tape against drum 24.

It is noted that the endless recording medium of FIG. 1 as well as in the other embodiments provided hereafter attains an equilibrium condition during the operation of the apparatus or changes in state at a substantially predetermined rate. In other words, at each point in its travel, the length of the tape or track is such that by the time any portion thereof reaches a predetermining station or position in its travel, it is at a predetermined temperature and in a predetermined physical-plastic condition. The tape or film entering the scanning field of the gun 16 is in a condition such that it will easily receive and store a scanned charge pattern which will permit the development of a deformation or ripple pattern after passing through the field of RF heater 29. By the time the film enters the second RF heater 30 all the charge in the storage layer has been dissipated so that upon cooling thereafter there will be no reformation of any prior deformations therein. In order to maintain such a point to point equilibrium condition, a heat transfer fluid or other heat transfer means may be utilized to cool the drum or idler 22 during operation of the apparatus, and the heat transfer rate may be controlled by control of the temperature and rate of flow of said fluid.

In a preferred form of the invention illustrated in FIG. 1 the endless recording film 26 is driven by an intermittent or stepping motor 27 which is adapted, each time its input 27' is energized by a pulse, to drive the film one frame length.

In a first method of operation, the optical projection system 31, 32 and the electron gun 16 are positioned relative the tape or film 26 such that when said film is stopped, respective frames are centered in the scanning fields of gun 16 and the projection system. While in this position, the projection lamp in housing 31 is flashed on so as to project the image of the light passing through the ripple pattern centered therein, onto a viewing screen. During the same time interval the gun 16 scans an image charge pattern onto the frame of the film centered in its field. The flashing of the lamp in 31 and the operation of stepping motor 27 is synchronized to the receipt of the video picture signal by 12 by clipping the frame vertical sync pulse in a sync clipper 33 and using this as a control signal to effect operation or flashing of the light in 31 and pulsing of motor 27. An adjustable delay line or relay 34 is provided in the output of the clipper 33 for adjustment of synchronization the output of which connects to the switching input of a normally open electronic gate 35 which when energized thereby gates a power supply PS to the lamp in 31. The output of 34 is also passed to a second adjustable time delay relay 34' which controls the operation of motor 27 and which may be adjusted to effect said synchronization of movement of the recording member.

In another mode of operation, the apparatus is adapted whereby the gun 16 will be modulated by a video picture signal and will scan continuously while the recording member 26 is in motion so that vertical deflection is attained by motion of the film. The electron beam therefor scans back and forth while the tape or film moves past, whereas in the former case, the beam was modulated to effect a frame raster scan.

In a third mode of operation, the recording member 26 is moved continuously at constant speed while the light source in housing 31 flashes on for a time duration in the order of a few milliseconds or less at the instant each frame is centered in the field of the projection optical system. Persistency of the projection image may be obtained by employment of a simple image converter preferably in the optical housing 32 which may comprise, for example, a transparent phosphor coating on a transparent plate therein or on one of the projection lenses and a simple field circuit for briefly retaining or causing images passing through said transparent member to persist for the desired short time period. In this third mode, the delay line 34' would be eliminated. Notation 40 refers to a vacuum pump operatively coupled to volume 11 defined by said housing 20.

While the transport for the film or tape 26 is shown in FIG. 1 in its simplest form, more complex transports may be provided employing a plurality of additional idlers or pulleys arranged to permit the use of a substantially longer length of film.

FIG. 2 illustrates a modified form of the invention which operates by the intermittent motion of the thermoplastic recording tape or belt 26 in which the brief period during which the belt is stationary is utilized for scanning an image forming charge pattern onto one frame of the belt while another frame located downstream is scanned by a projection light beam for projecting the image thereof onto the viewing screen.

The walls of the air evacuated housing serve as means for supporting bearings or pillow blocks which rotationally support the shafts of four spaced apart pulleys or drums 22a, 22b, 24a and 24b around which the closed loop recording belt 26 is driven. The drum 22b is shown operatively connected to the output shaft 42' of a stepping motor 42. The stepping motor is designed to effect the advance of the film 26 one frame length each time the input to said stepping motor is pulsed. The motor advances the tape a frame and stops it with the next frame centered in the scanning field of the electron gun 16'. The next frame relative to the projection optical system 32, 36 is also centered in the projection or scanning field thereof. In other words, both the image charge pattern scanner 16' and the projection optical system are positioned whereby a respective frame of the recording member will simultaneously be centered in each for scanning.

A receiver or generator 12 of a plurality of composite television signals has its picture signal output 12a operatively connected for modulating the intensity of the beam generated at electrode 17. The notation 12b' refers to an output of 12 which is connected to the beam deflection means 18' in electron gun 16'. The notation 18' refers to the vertical and horizontal beam deflection controls for the beam generated in 16' which controls or deflection means are modulated by frame and line vertical and horizontal sync signals which are separated in 12 from the composite video signal. The notation 12' actually refers to plural lines extending from 12 each connected to a respective deflection means for said beam. A conventional raster scan may be employed to control the beam in 16' in scanning a single frame while the recording member is stationary.

Synchronization and control of the movement of the recording member is effected by clipping the frame vertical sync signal from each composite video signal in a vertical sync clipper 33 and utilizing it to either pulse or indirectly control the stepping motor 42. The notation 34 refers to an adjustable time delay relay in the output of 33 for adjustment of the movement of the recording member to the appearing of the incoming video signal. The pulse output of 34 is passed directly to the energizing input of stepping motor 42.

Situated downstream of 16' is a first RF heating means 29 which is operated either continuously to heat the thermoplastic material to a condition where said image ripple pattern is developed therein or may be operated intermittently only when the recording member is in motion. The pulse formed at the output of delay line or relay 34 may be passed to close a slow-to-open switch situated in series with the RF electrodes of 29 and the RF generator therefor which may be effective in energizing 29 for just the period the recording member moves.

The projection system is located beyond 29 and consists of a light source in a first housing 36 aligned with a second housing 32 containing either Schlieren or the modified optical system described for projecting colored images on a screen. A shutter 37 is operatively coupled to the stepping motor output and when operated by 42, when the film 26 is stationary, permits light from 36 to pass through the frame centered in its scanning field to the optical system in 32. Situated downstream of the projection system is a second RF heating means 30 which is effective in erasing the deformations in the recording member before passing to the scanner 16'.

Another form of the invention is illustrated in FIG. 3 in which a closed loop thermoplastic recording member as described is scanned continuously by a line scanning means 16 which is similar in structure and operation to that provided in the embodiment of FIG. 1 while another portion of the closed loop belt 26 is intermittently driven past a projection apparatus 44. In other words, writing or recording is effected by continuous scanning while reading or projection is effected while a portion of the recording member is held stationary. The beam is modulated and its deflection controlled by signals on outputs 12a and 12b of receiver-generator 12 as described and the image ripple pattern is developed by means of heat generated by RF heater 29.

The air evacuated housing 20" for the apparatus provides means for supporting the bearings supporting the shafts of four drums 22a, 22b, 24a and 24b plus sprocket wheels 43a and 43b which guide and/or drive said belt past projection apparatus 44. The mechanism 44 may comprise the conventional transport, guide and intermittent driven means such as provided in a conventional motion picture film projector which also includes means for intermittently operating a shutter 37' for passing light from a source situated within the housing of 44'. The output shaft 28 of the constant speed drive motor 27 may be directly or indirectly operatively connected to both sprocket wheels 43a and 43b and the general mechanism for intermittently advancing the slacked portion 26' of the film or belt past the light source aperture and shutter associated with 44' which shutter is operatively connected to 27 and operates synchronously with the rotation of the sprocket drive means. The other elements of the projection optical system are also contained in forward housing 32 and function as described.

In FIG. 3, the recording film 26' is provided with a plurality of longitudinally extending equispaced slots along one or both marginal borders thereof in the manner provided in conventional motion picture film which slots are engaged by the intermittent advancing mechanism and shutter drive 37' associated with 44'. Said film advancing and shutter operating mechanism is thus driven by movement of the film or may be gear coupled to the output of the primary drive servo 27. Deformation pattern fixing heater 29 operates continuously to develop the frame images resulting from continuous scanning of the constantly moving film and heater 30 is effective in erasing all deformations prior to scanning a new image series onto the film.

If video picture signal generator 12 is a receiver for short wave television picture signals it will be necessary to synchronize the movement of the film with the receipt of picture signals so that each picture frame will be recorded and registered in a frame defined by the border slots of said film. Synchronization may be effected by moving the position of the aperture of the shutter mechanism 37' to obtain vertical alignment of the projected image or by controlling the drive of the film by starting said film in a predetermined manner whereby the leading edge of each frame thereof enters the scanning field or line of the beam of gun 16 just as the next picture signal begins to modulate the beam thereof. Such synchronization may be effected by clipping the frame vertical sync pulse from each frame picture signal and utilizing the clipped signal for synchronization means. If motor 27 is a synchronous motor, the clipped sync signal may be used to drive said motor in phase with the picture signals to effect synchronization. In FIG. 3 motor 27 is shown provided with a pulse energizable start control 27F. A sync clipper clips the vertical sync pulse from the picture signal which is passed to a manually adjustable time delay relay 34 the output of which is connected to control 27F through a manual bi-stable start switch 46. If control 27F is operative to start the motor and effect its acceleration in a predetermined manner which is reproducible each time 27F is energized, then by adjustment of 34 film 26' may be started and driven at constant speed thereafter whereby each frame ripple pattern will be substantially centered in a frame position as defined by the border slots.

Housing 44' contains in addition to the proper light source, and condensing lens necessary to project the diffraction pattern images such optical components such as gratings or the like necessary to define said light source as plural light sources for the projection of color images. Housing 32 contains the necessary projection lenses and adjustment therefor as well as the necessary grid for projecting images of this type.

It is assumed in the embodiment of FIG. 3 as well as in the other embodiments of this invention that the proper power supplies are provided on the necessary sides of all servos, relays, light sources, controls and the like to permit operation thereof.

Figures 4, 5, 6, 7, 8, 9:
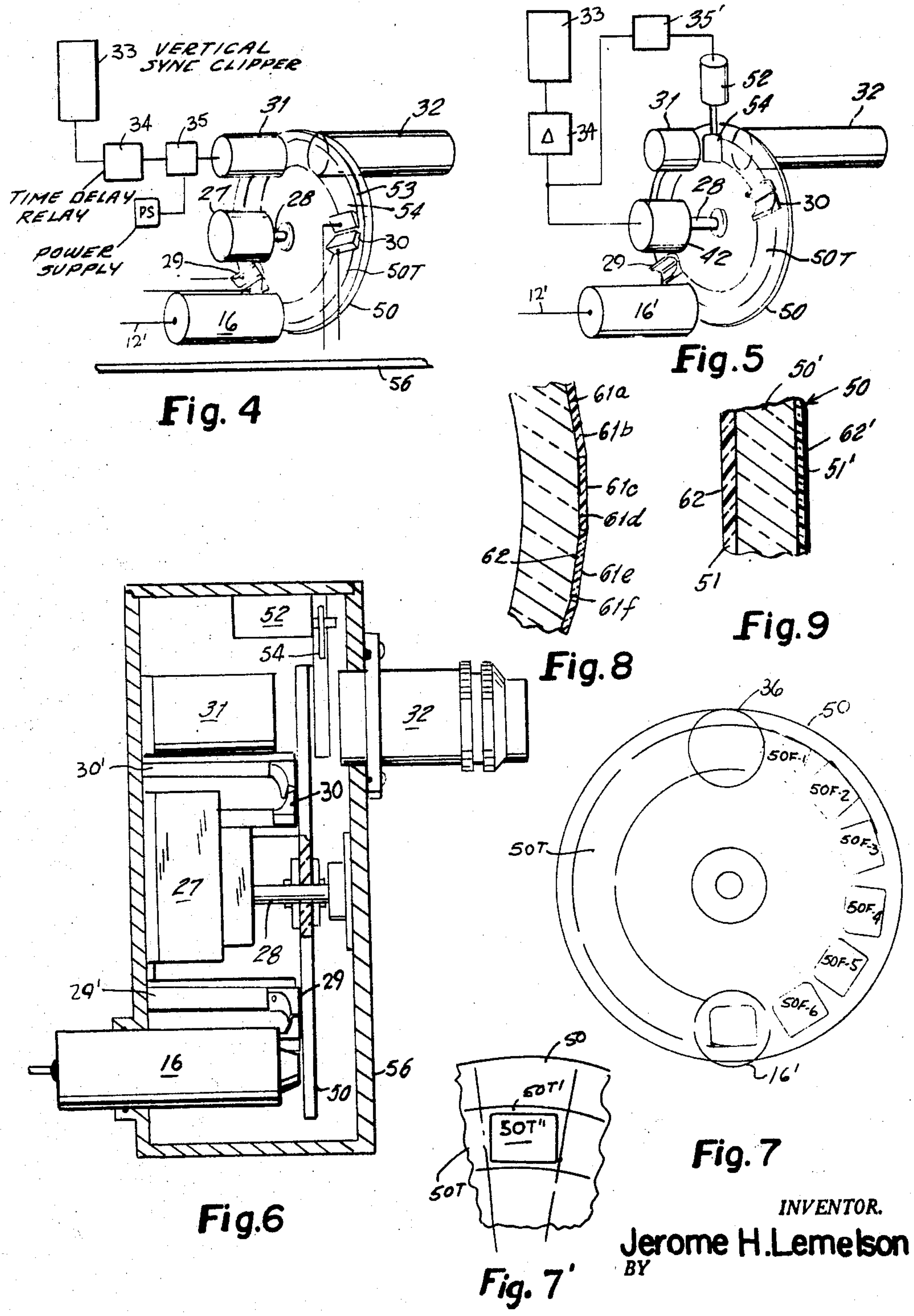
FIG. 9 is a view in cross section of a fragment of an improved erasable image recording disc of the type illustrated in FIGS. 4 to 6.

In FIG. 4 is shown a projection apparatus in the realm of the invention utilizing a rotating disc as the conveyance for the erasible recording medium. The disc 50 is preferably made of optical glass and is supported in bearing for rotation about its central axis within a housing 56 which is preferably an air tight enclosure provided with means for evacuating air therefrom if the recording medium is a thermoplastic recording material as described. An annular area 50T in the path of a scanning electron gun 16 is utilized as a recording area or track and extends for 360 degrees around one face of the glass disc. Either this area or the entire face of the disc may be coated with erasible recording material. The projection system consists of a projection light source grating, etc., in a light housing 31 which faces one side of the disc in line with a projection optical system 32 both of which are supported by the housing 56. The motor 27, the shaft 28 of which is secured to the disc is either a constant speed motor or a stepping motor depending on the characteristics of the received video signal and the shutter optics employed, as well as the type of writing effected by electron gun 16. Charge patterns of electrons stored in the recording layer in track 50T convert the thermoplastic material to image ripple patterns as the disc rotates past RF heating head 29 which is closely spaced to the surface of the disc by a mount secured to the housing or lightly contact the surface of said disc. After the track in its clockwise rotation has passed through the optical scanning system, it passes a second RF heater 30 which heats the thermoplastic layer to a higher temperature for erasing the ripples therefrom.

Synchronization of the light source operation is effected by clipping the vertical frame sync signal by means of sync clipper 33 which signal passes through an adjustable delay line or time delay relay and then to the switching input of a normally open electronic switch 35 for gating a power supply PS to the light source. If motor 27 is a stepping motor, the pulse output of 34 or 33 may also be passed to operate the motor to step its shaft for moving the disc to the next frame position. If motor 27 is operating to rotate disc 50 at constant speed, the magnitude of which is such to produce a blurred image when projected, the optical system may have incorporated therein movable components which are operated by a servo to move at the same relative speed with the moving disc (i.e. the same rotational speed as the recording track) during the period the light source is passed through the recording track and projected. The servo controlling movement of the prism, mirror or lens in the optical system may be controlled or synchronized in its operation to the rotation of 50 and/or flashing of the light source by utilizing a sync signal such as that appearing on the output of either 33 or 34. Such a servo operated optical system may also be applied, for example to the embodiment illustrated in FIG. 1.

It is assumed that certain of the modes of control applied to FIGS. 1 to 3 are also applicable to the devices of FIGS. 4 and 5 as well as to device employing drums or other means as the thermoplastic recording medium or support therefor. Referring to FIGURE 4, a recording disc 50 is preferably rotationally supported in an air evacuatable housing. Cooling or heat dissipation from the disc generated either by the light source in 31 or the RF heads may be effected by circulating a liquid through the disc inward of the recording track 50T, which may be admitted and exhausted through shaft 28 or by thermoelectric cooling means secured to the disc and energized by electrical energy supplied through conductors secured to 50 and enerigzed by current fed through brushes riding against rotating shaft 28.

FIG. 5 illustrates a rotating disc video projection apparatus similar to that shown in FIG. 4 with the exception that an electromechanical shutter 54 is provided to retract or open each time a frame is centered in the optical system. The shutter plate 54 is driven by a monostable solenoid 52 having an input which, when pulsed, retracts 54 to permit light from the source in housing 31 to pass through the disc and the optical system in housing 32. The solenoid automatically projects shutter plate 54 after being pulsed and retains said plate open for a predetermined short interval which may be approximately 1/30 of a second or less. The vertical sync signal clipped by 33 is passed to an adjustable time delay relay 34 which is adjusted for synchronizing the operation of stepping motor 42 so that scanning occurs only when the disc is stationary. The rotation 35' refers to a second time delay relay having an input from the output of 34 for adjusting the operation of solenoid 52 so that the shutter 54 is operated to open at the proper instant.

FIG. 6 illustrates the apparatus of either FIG. 4 or 5 from the side with one wall of the housing 56 removed or sectioned. The glass disc 50 is supported in bearing by the shaft 28 of the motor 27 and a ball bearing secured to the front wall of 56. The light source housing 31 is supported by the rear wall of the housing and 32 by the front wall, an opening in which it passes through. The RF heating heads 29 and 30 are respectively supported on mounts 29' and 30' which are secured to the rear wall of housing 56 and position them adjacent or against the face of the disc. The shutter 54 is supported by the top wall as is the servo 52 operating said shutter. The electron gun is positioned by the rear wall of 56 in alignment with the rear face of the disc 50 and aligned with the recording track. The housing 56 is airtight and a vacuum pump (not shown) is connected thereto for air removal therefrom.

FIG. 7 illustrates a possible frame arrangement on the face of the disc. Frame positions in the annular recording area 50T are illustrated at 50F–1, 50F–2, etc. Whereas only 14 frames are illustrated, since it takes a fraction of a second for the thermoplastic material to be deformed into said ripple image pattern, a disc having at least 30 frames and preferably at least two or more multiples of 30 frames provided on its surface is preferable. If frame dimensions are ¼" x ¼" a disc 10 to 15 inches in diameter will provide an annular area near its periphery which will permit at least 120 to 150 frames to be spaced in one circumference or revolution of the disc. If received frame frequency is 30 per second this should provide ample time for the thermoplastic material of each frame to change physical state or shape during development and erasure of the image ripples.

Since the area scanned by the electron gun, for continuous scanning, is actually an annular band a complete segment of each arc cannot be projected if a rectangular image is desired in the projection, for example, of conventional motion pictures. FIG. 7 illustrates a portion of the disc 50, the annular band like recording area 50T and that portion 50T'' of each frame 50T' of 50T which is actually projected. This is effected by use of the proper shaped aperture in the optical projection system. The area 50T'' is preferably rectangularly shaped and is substantially centered in the area 50T'.

A rotating, transparent drum may also be used as the means for conveying the recording member or material through the electron gun and optical scanning fields. The structure illustrated in FIG. 8 shows a portion of such a drum wall modified to eliminate optical distortion during projection. Since distortions in the image will occur if a cylindrical walled drum is employed, the wall has been modified whereby each frame position is defined by a flat rear surface portion and a flat front surface portion referred to respectively by the notations **61*a*, 61*b*, 61*c*, 61*e* and 61*f*. By driving the drum intermittently to center each frame position in the optical system with the light source situated inside the drum, in the manner the disc 50 was driven and controlled, a beam of projection light may be passed through each circumferential segment of the drum defined by said aligned flat surfaces. The notations 61*a*, 61*b***, etc. refer to portions or strips of thermoplastic recording material on each of the flat outside surfaces of the drum.

FIG. 9 shows a segment of the recording disc 50 in cross section. The glass or stable plastic base 50 has a layer or strip or thermoplastic recording material 51 bonded to at least one surface thereof. The notation 51' refers to a second layer, coating or strip of thermoplastic material applied to the opposite surface of the disc on which 51 is applied. If an electron gun and heating means as described are provided on each side of the disc (or on each face of the thermoplastic recording film of FIGS. 1 to 3) then images may be simultaneously applied to both faces of the recording member which may be simultaneously projected by passing projection light therethrough for optical comparison or other purposes. Inspection functions may be performed with such a recording member in which image position, contour, dimensions, etc., may be so compared by projection or by automatic scanning. Notation 62 in FIGS. 8 and 9 refers to a transparent conducting coating disposed between the thermoplastic layer and the transparent supporting base in which conducting coating currents are induced by means of said heating means 29, 30 for the purposes of developing the image ripple patterns and erasure or smoothing out thereof. In FIG. 9, transparent conducting coatings 62 and 62' are provided on both faces of the transparent insulating base 50' prior to the application of the respective thermoplastic coatings thereon. In another structure, the layers referred to by the notations 51 and 51' may also comprise respective thermoplastic recording films which include in addition to a thermoplastic recording material, a standard motion picture film base with a transparent conducting coating disposed between the two with said recording film sandwich assemblies being adhesively bonded with transparent adhesive to base plate or sheet 50'.

While member **50*a* of FIG. 9 comprises a rigid erasable recording disc for use in apparatus such as illustrated in FIGS. 4 and 5 the base 50' may also be flexible material such as transparent sheet or film with either or both faces thereof laminated with or coated with thermoplastic recording material as described. If a double faced recording structure is provided in which images or ripple paterns may be recorded simultaneously or at different times on each face thereof for comparison or other purposes, then the interlayer or base 50' is preferably of such a thickness that it provides sufficient insulation between the two thermoplastic recording layers or films capping said base to permit one surface to be scanned with an electron gun and to have an image charge pattern developed in the thermoplastic layer thereof without creating a charge pattern or electrically effecting the thermoplastic layer on the opposite surface thereof. If selective area erasure is required, then said base material 50'** is preferably sufficiently insulating to prevent induction energy applied at one side of the member for heating and developing or erasing ripple patterns in the thermoplastic layer thereof from affecting or changing the physical shape of the thermoplastic material on the other face of the base.

While a so called thermoplastic recording medium and an optical system for projecting either black and white or colored images by the passage of light through said medium has been provided as the erasable recording members hereinabove provided, it is noted that any other type of erasable recording medium may be employed for diffracting and/or absorbing light passed therethrough in the various areas in which image development may take place. The image projection system will, of course, be that which is best operative for the particular medium. For example, the projection of an image recorded as color and/or tone changes in a recording medium may be effected by a conventional projection optical system designed for either passing projection light completely through the recording medium if transparent or for effecting image projection by reflection of light off the image recording medium.

In the embodiments illustrated in the drawings, it is assumed that the correct power supplies are provided on the correct sides of all switches, light sources, servos and the like. It is furthermore noted that of the light sources of the various embodiments illustrated, the light sources may comprise means for generating coherent light such as optical masers wherein the movable recording members may be used as means for modulating said light for projection or communication purposes. The movable erasable recording member may therefore be used essentially as a light valve for the spatial modulation of light which may operate at video frequencies.

In certain image storage and reproduction or projection functions, it may be desirable to change only a portion of the field of the recording. For example, if the hereinabove described endless track recording members such as the disc or closed loop tape containing thermoplastic recording material are used for viewing or projecting a display, only a portion of which changes with time such as a radar display, then it may be requisite to alter only a portion or small area of the recording or thermoplastic deformations, by erasing said small area per se or prior to recording a new image ripple pattern thereon. Such limited area erasure may be effected by the selective operation of one or more of a plurality of induction heaters which cover or are scanned by thin annular recording areas of the recording disc or narrow band areas of the film or belt.

Another means for effecting the selective erasure of a thermoplastic recording member is hereby proposed which utilizes the heat generated by a focused beam to heat the thermoplastic layer of said recording member on those selected areas of the member on which said beam is focused whereby the local heat generated thereby is sufficient to effect the erasure of any deformations or recordings therein. A positionally controlled beam may also be utilized to effect the development of images in local areas of a thermoplastic recording member without effecting the erasure of adjacent areas. Said beam may either be an electron beam generated by an electron gun which is modulated and positionally controlled in response to an input command signal such as a video signal or a light beam generated by an optical maser and focused onto said predetermined area by a servo controlled deflection means for a focusing lens which servo is operated by positional command signals. The beam may also be intensity modulated to permit only a fading of the image scanned thereby and to provide heating control for different operating speeds of the recording member.

In effecting the erasure of a predetermined area or areas of a thermoplastic recording member by means of a beam of sufficient energy to locally heat said areas to a plastic or semi-molten condition, said heating may be effected by movement of the beam across said area while the recording member is either in motion or stationary. Conventional raster scanning may be employed for beam erasure using an electron gun. A single beam sweep may also be employed in which the width of the beam focused on the recording member is modulated or varied to permit said beam to project against the area necessary to effect erasure of the desired area. Beam width and intensity modulation, plus initial beam displacement or positioning will suffice in apparatus in which the recording member is constantly moved through the field of the beam. Where beam scanning during erasure is employed, account must be made of the movement of the recording member in deflection control of the beam to scan the predetermined area. Beam deflection control signals may therefore be generated by a computer to effect erasure of the predetermined recording area. The simplest type of beam control may be effected for erasure of predetermined areas by generating coordinate scanning signals to control said beam while the recording member is stationary while, for example, the recording member is in a stopped condition during intermittent drive thereof. The erasure beam generating means is therefore prepositioned relative to the recording member whereby the beam thereof, when deflected by predetermined deflection signals will scan predetermined coordinate areas of each frame while the recording member is stopped. In yet another form, the same electron gun which is used to scan and provide image charge patterns in the thermoplastic recording member may also be used to effect the erasure thereof. This may be effected by intensity modulating the same charge developing beam to heat predetermined areas of the recording member in response to input signals thereto or by the employment of two beams, a heating and a writing beam in one gun.

Figure 10:
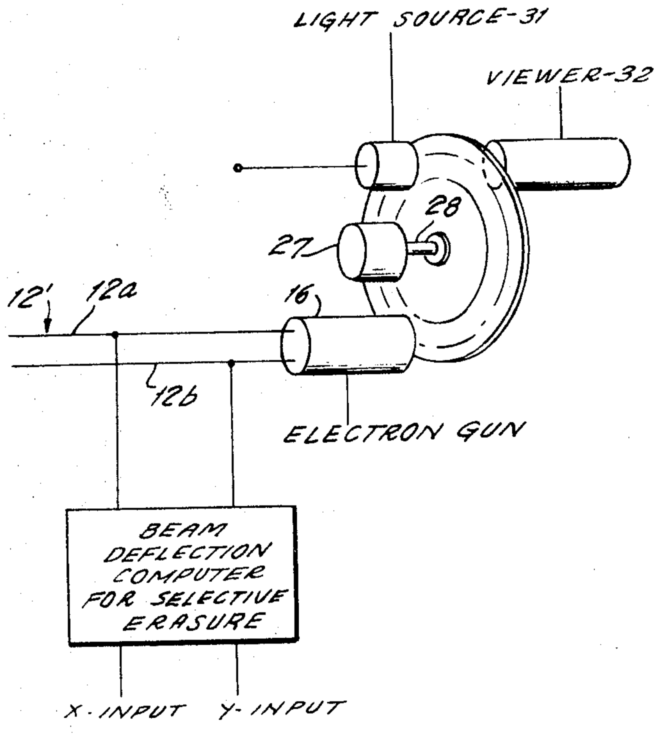
FIGURE 10 is similar to FIGURE 4 and shows the addition of selective area erasure control means for the electron gun.

FIGURE 10 shows the manner in which the embodiment of FIGURE 4 can be modified to use the novel concept of selective area erasure by suitable control of the writing electron beam. Thus in FIGURE 10, a suitable computer structure 80 is connected to input control terminals 12′ of electron gun 16. The discrete area to be erased is then applied to the X and Y input terminals of computer 80. The computer 80 will then generate control signals to the electron gun 16 and its deflection terminals to effect suitable control over the electron beam to cause the desired erasure of the small area defined by the X and Y input signals.

I claim:

1. A recording and reproduction system comprising in combination with a heat developable and erasable recording member, a recording transducer means including means for generating and controlling an electron beam, means for guiding and driving said recording member in a predetermined path relative said transducer means for recording thereon, means for modulating and controlling said beam to selectively record signals onto predetermined areas of said recording member, a reproduction transducing means including a scanning electron beam, means for controlling said scanning beam to read and reproduce from predetermined areas of said recording member, and an erasure transducing means including means for generating and controlling an erasure electron beam to scan predetermined areas of said recording member in response to control input signals, the intensity of said erasure electron beam being modulatable to a degree whereby when directed and retained against a spot area of said recording member it will heat said area to a degree whereby erasure of a recording thereon will be effected without the erasure of recordings on adjacent areas not scanned by said erasure beam.

2. An erasable recording system comprising in combination with a heat erasable image recording member, a recording transducer means including means for generating an electron charge in a selected and predetermined area of said recording member, an image developing means for developing an image pattern in a selected and predetermined area of said recording member, a reproduction transducing means for optically reading said image pattern, and an erasure transducing means comprising in combination with an electron gun, means for generating an electron beam and for focusing said beam on a predetermined area of said recording member whereby said beam is effective in heating said area, a deflection control means for said beam responsive to input signals, means for generating input signals for controling said beam to scan a predetermined path along the surface of said recording member and for modulating the intensity of said beam when on predetermined areas thereof to heat said recording member and effect erasure of recordings from said predetermined areas, said beam being also controllable and intensity modulatable to effect the development of new images in selected areas of said recording member by its generation of heat therein.

3. Recording and reproduction apparatus comprising in combination, a transparent disc made at least in part of a thermoplastic recording material, said disc having a plurality of concentric circular recording tracks defined radially about its surface, means for writing an erasable image as a ripple pattern onto a selected length of a selected of said concentric tracks, said writing means including an electron beam generating means having a beam deflection means adapted for focusing an electron beam radially on the surface of said disc between the innermost recording track and the outermost recording track and including means for generating a line sweep substantially the width of the selected recording track as the disc rotates whereby a segment of a band area of said disc may be swept by said beam as the disc rotates and a charge pattern of a picture image may be generated therein, and means for selectively optically scanning, fixing and erasing images in said disc determined by said electron beam writing means.

4. Recording and reproduction apparatus comprising in combination, a transparent disc made at least in part of a thermoplastic recording material, said disc having a plurality of concentric circular recording tracks defined radially about its surface, means for writing an erasable image as a ripple pattern onto a selected length of a selected of said concentric tracks, said writing means including an electron beam generating means having a beam deflection means adapted for focusing an electron beam radially on the surface of said disc between the innermost recording track and the outermost recording track and including means for generating a line sweep substantially the width of the selected recording track as the disc rotates whereby a segment of a band area of said disc may be swept by said beam as the disc rotates and a charge pattern of a picture image may be generated therein, and means for selectively optically scanning, fixing and erasing images in said disc determined by said electron beam writing means, said means for erasing images including electron beam control means for focusing said electron beam in a small predetermined area of said recording material whereby to heat said predetermined area to effect erasure of a recording in said predetermined area without the erasure of adjacent means.

References Cited by the Examiner

UNITED STATES PATENTS

| | | | |
|---|---|---|---|
| 2,005,914 | 6/1935 | Freund | 178—6.6 |
| 2,026,872 | 1/1936 | De Forest. | |
| 2,160,888 | 6/1939 | Moller | 178—7.5 |
| 2,294,180 | 8/1942 | Heising | 178—6.6 |
| 2,391,451 | 12/1945 | Fischer | 178—7.5 |
| 2,875,436 | 2/1959 | Hammond. | |
| 3,008,066 | 11/1961 | Newberry | 178—6.6 |
| 3,120,991 | 2/1964 | Newberry | 178—6.6 |
| 3,121,216 | 2/1964 | Wolfe | 178—6.6 |

OTHER REFERENCES

Video Tape Recording, pp. 261–263, Bernstein, published by John F. Rider, Inc., New York.

DAVID G. REDINBAUGH, *Primary Examiner.*

BERNARD KONICK, H. W. BRITTON, *Assistant Examiners.*